United States Patent [19]

Beppu et al.

[11] Patent Number: 5,601,166
[45] Date of Patent: Feb. 11, 1997

[54] ALIGNING TYPE ROLLER CLUTCH

[75] Inventors: Masayuki Beppu, Iwata; Toshihide Gotoh, Shizuoka-ken, both of Japan

[73] Assignee: NTN Corporation, Osaka-fu, Japan

[21] Appl. No.: 524,028

[22] Filed: Sep. 6, 1995

[51] Int. Cl.$^6$ ................................................ F16D 41/06
[52] U.S. Cl. .............................. 192/45; 384/495; 403/4; 192/112; 192/110 B
[58] Field of Search ..................... 192/45, 112, 110 B; 384/495, 558; 403/3, 4, 335

[56] References Cited

U.S. PATENT DOCUMENTS

| | | | |
|---|---|---|---|
| 3,011,606 | 12/1961 | Ferris et al. | 192/45 |
| 4,951,796 | 8/1990 | Harrington et al. | 384/495 X |
| 5,074,393 | 12/1991 | Itomi | 192/45 |
| 5,078,243 | 1/1992 | Kanai et al. | 192/45 |
| 5,433,305 | 7/1995 | Takamatsu et al. | 192/45 |

FOREIGN PATENT DOCUMENTS

7-88285  4/1995  Japan.

*Primary Examiner*—Andrea L. Pitts
*Attorney, Agent, or Firm*—Nikaido, Marmelstein, Murray & Oram LLP

[57] ABSTRACT

A bearing housing (6) for receiving a rolling contact bearing (3) is formed to be integral with the main frame (4), the outer flange portion (5b) of a clutch housing (5) for receiving the roller clutch (2) and the inner flange portion (6b) of the bearing housing (6) axially engage each other through an annular member (7) of resin or rubber, notch portions (5d) and tooth portions (6c) circumferentially engageable with each other are distributively provided in the clutch housing (5) and the bearing housing (6), and radial and axial clearances (S1) and (S2) are formed for floating the clutch housing (5) relative to the bearing housing (6).

4 Claims, 8 Drawing Sheets

ALIGNING TYPE ROLLER CLUTCH

BACKGROUND OF THE INVENTION

This invention relates to an attachment structure for an aligning type roller clutch which can be utilized in rotation drive system of a washing and dehydrating tank for a full automatic washing machine.

In a full automatic washing machine, since the wash and dehydration of the washing are effected in a common tank (washing and dehydrating tank), the washing and dehydrating tank is at rest during washing and is rotated only during dehydration. The rotation control of this washing and dehydrating tank is effected by controlling the rotation of a cylindrical tank shaft extending downwardly from the middle portion of its bottom. That is, inserted in the cylindrical tank shaft is a fan shaft rotatable in both directions connected to a rotation drive source. During washing, only the fan shaft is rotated while restraining the rotation of the cylindrical tank shaft by means of a one-way clutch and brake belt, and during dehydration, the restraint from the brake belt is removed to allow the fan shaft to rotate in the free direction of the one-way clutch so as to rotate the cylindrical tank shaft and fan shaft together. And on completion of dehydration, the brake belt is actuated to stop rotation of the cylindrical tank shaft.

As for such one-way clutch, a roller clutch is in frequent use. A roller clutch comprises, for example, an outer ring having a plurality of cam surfaces on its inner peripheral surface and defining a plurality of wedge spaces between the individual cam surfaces and the outer peripheral surface of a rotatable a shaft to be controlled, needle rollers disposed in the wedge spaces, a retainer having a plurality of pockets for receiving the needle rollers, and spring means for urging the needle rollers toward the narrow clearance sides of the wedge spaces. When the rotatable shaft is rotated in the one direction, the needle rollers engage the narrow clearances of the wedge spaces to transmit torque. Reversely, when the rotatable shaft is rotated in the other direction, the friction forces between the needle rollers and the rotatable shaft move the needle rollers against the force of the spring means until they leave the narrow clearances of the wedge spaces, whereby transmission of torque is cut off. The spring means causes the needle rollers to move quickly from the released state to the engaged state, to improve the response characteristics of the clutch.

The original function of the roller clutch resides in the transmission and cut-off of torque and since the roller clutch itself has no sufficient load supporting ability, it has been common practice to use both a roller clutch and a rolling contact bearing in order for the rolling contact bearing to perform the function of supporting the rotatable shaft and for the roller clutch to perform the original function of torque transmission and cut-off. In concrete, two types are known: the so-called separate type in which a roller clutch and a rolling contact bearing are separately attached to the main frame, and the unit type in which a unitized assembly of a roller clutch and a rolling contact bearing is attached to the main frame. As for the separate type, it has been common practice to fix a clutch housing to the main frame by bolts and nuts.

Depending on the attachment error or the like, inclination develops in the rotatable shaft, and if the angle of inclination is too large, an unbalanced load acts on the outer ring of the roller clutch, so that the torque is not uniformly transmitted to the cam surfaces, incurring the danger of the durability of the cam surfaces being adversely influenced. Also there is an anxiety about the durability of the spring means which presses the needle rollers. Among other things, in a full automatic washing machine, since a high centrifugal force is applied to the rotatable shaft, it is necessary to take measures against eccentricity and inclination of the rotatable shaft.

In the separate type, however, the clutch housing has to be fixed to the main frame, and when bolts and nuts are used for fixing, the problem is that the fixing operation takes considerable man-hour.

SUMMARY OF THE INVENTION

Accordingly, a main object of the invention is to simplify the attaching construction of a separable type roller clutch having an aligning function for absorbing the eccentricity and inclination of a rotatable shaft.

The aligning type roller clutch of the present invention for controlling the direction of rotation of a rotatable shaft supported for rotation in a main frame through a rolling contact bearing, a bearing housing for receiving a rolling contact bearing is formed to be integral with the main frame, the outer flange portion of a clutch housing for receiving the roller clutch and the inner flange portion of the bearing housing are adapted to axially engage each other, tooth portions and notch portions circumferentially engageable with each other are distributively provided in the bearing housing and the clutch housing, and radial and axial clearances are formed for floating the clutch housing relative to the bearing housing, whereby the clutch housing is alignably attached to the main frame.

The means for preventing rotation of the clutch housing relative to the bearing housing is formed by the circumferentially mutually engageable tooth and notch portions, which are distributively provided in the clutch housing and bearing housing. In other words, the tooth portions may be provided in the bearing housing and the notch portions in the clutch housing, and vice versa.

Further, the aligning type roller clutch according to the invention for controlling the direction of rotation of a rotatable shaft supported for rotation in a main frame through a rolling contact bearing, wherein a bearing housing for receiving a rolling contact bearing is formed integrally with the main frame, the outer flange portion of a clutch housing for receiving the roller clutch and the inner flange portion of the bearing housing are adapted to axially engage each other through an annular member of resin or rubber, tooth portions and notch portions circumferentially engageable with each other are distributively provided in the bearing housing and the clutch housing, and radial and axial clearances are formed for floating the clutch housing relative to the bearing housing, whereby the clutch housing is alignably attached to the main frame.

The tooth portions may be provided in the bearing housing and the notch portions in the clutch housing, and vice versa.

The presence of the radial and axial clearances enables the clutch housing to move within the range of the clearances in opposed relation to the bearing housing. Therefore, if the rotatable shaft becomes inclined or eccentric, the clutch housing is radially and axially moved in response to such movement of the rotatable shaft to maintain the aligned state of the roller clutch relative to the rotatable shaft. Thus, even if the rotatable shaft becomes inclined or eccentric, automatic aligning is effected by the movement of the roller clutch, thereby preventing unbalanced loading during torque transmission, securing the stabilized clutch function.

Axial engagement between the outer flange portion of the clutch housing for receiving the roller clutch and the inner flange portion of the bearing housing provides means for preventing the clutch housing from slipping off. Further, circumferential engagement between the tooth portions and notch portions distributively provided in the bearing housing and the clutch housing provides means for preventing rotation of the clutch housing.

In the second invention, axial engagement between the outer flange portion of the clutch housing for receiving the roller clutch and the inner flange portion of the bearing housing through an annular member of resin or rubber provides means for preventing the clutch housing from slipping off. Interposition of the annular member of resin or rubber between the bearing housing and the clutch housing enables the absorption of shock and vibration which are likely to attend the on/off movement of the roller clutch.

Circumferential engagement between the tooth portions and notch portions distributively provided in the bearing housing and the clutch housing provides means for preventing rotation of the clutch housing.

According to the third invention, engagement between the tooth portions of the bearing housing and the notch portions of the clutch housing provides means for preventing rotation of the clutch housing.

According to the forth invention, engagement between the notch portions of bearing housing and the tooth portions of the clutch housing provides means for preventing rotation of the clutch housing.

As described above, the aligning type roller clutch of the present invention for controlling the direction of rotation of a rotatable shaft supported for rotation in a main frame through a rolling contact bearing, is characterized in that a bearing housing for receiving a rolling contact bearing is formed to be integral with the main frame, the outer flange portion of a clutch housing for receiving the roller clutch and the inner flange portion of the bearing housing are adapted to axially engage each other tooth portions and notch portions circumferentially engageable with each other are distributively provided in the bearing housing and the clutch housing, and radial and axial clearances are formed for floating the clutch housing relative to the bearing housing, whereby the clutch housing is alignably attached to the main frame. Thus, the structure is simplified and the attaching operation is simple and easy.

Further, since the annular member of resin or rubber is interposed between the clutch housing and the bearing housing, there are other effects that shock and vibration which are likely to attend the on/off movement of the roller clutch are absorbed and that the occurrence of noise and abnormal sound is suppressed.

BRIEF DESCRIPTION OF THE DRAWINGS

FIG. 1 is a sectional view (FIG. a: along the line a—a in FIG. b), and a front view (FIG. b: taken in the direction of arrow b in FIG. a);

FIG. 2 is an enlarged view of FIG. 1a;

FIG. 3 is a sectional view (FIG. a: taken along the line a—a in FIG. b) and a front view (FIG. b: taken in the direction of arrow b in FIG. a), showing another embodiment;

FIG. 4 is a sectional view (FIG. a: taken along the line a—a in FIG. b) and a front view (FIG. b: taken in the direction of arrow b in FIG. a), showing another embodiment;

FIG. 5 is a sectional view (FIG. a: taken along the line a—a in FIG. b) and a front view (FIG. b: taken in the direction of arrow b in FIG. a), showing another embodiment;

FIG. 6 is a sectional view (FIG. a: taken along the line a—a in FIG. b) and a front view (FIG. b: taken in the direction of arrow b in FIG. a), showing another embodiment;

DESCRIPTION OF PREFERRED EMBODIMENTS

Embodiments of the invention will now be described.

Figure 1A:
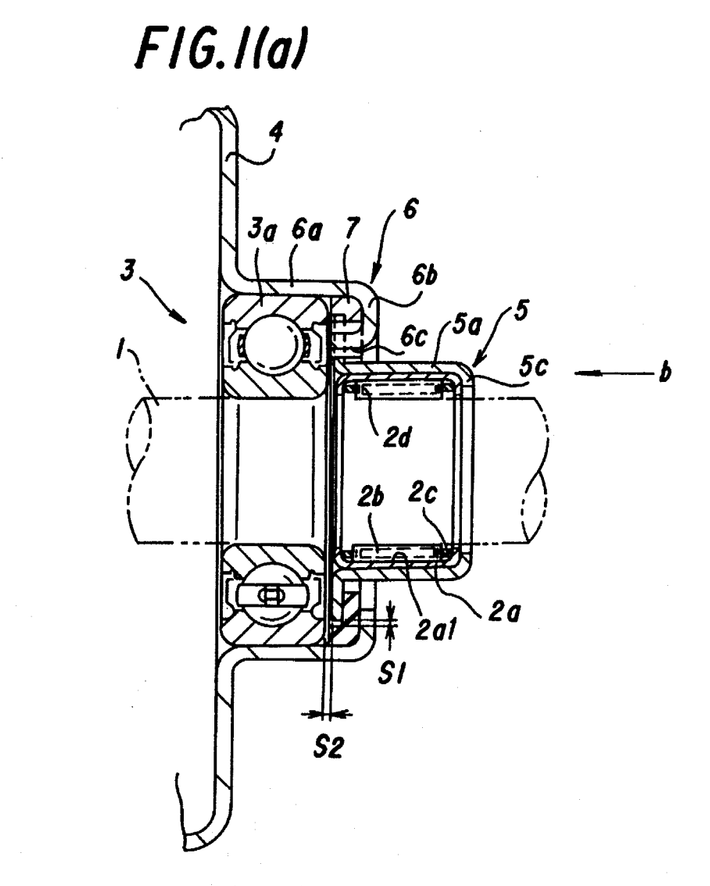
Figure 1B:
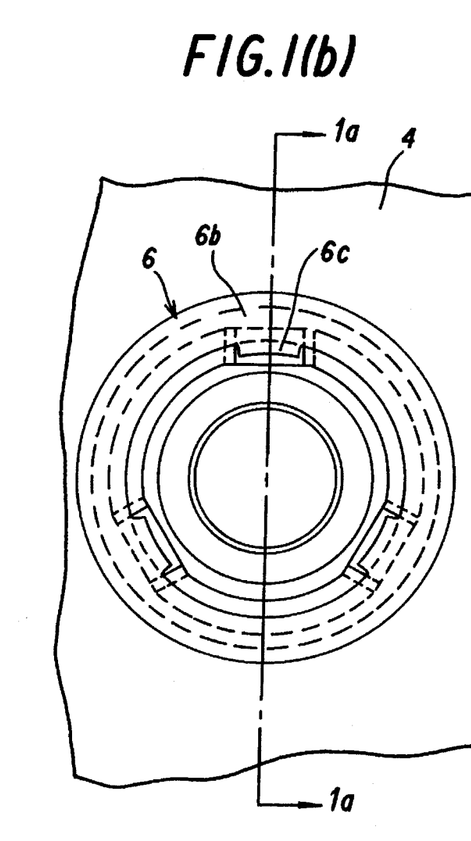
Figure 2:
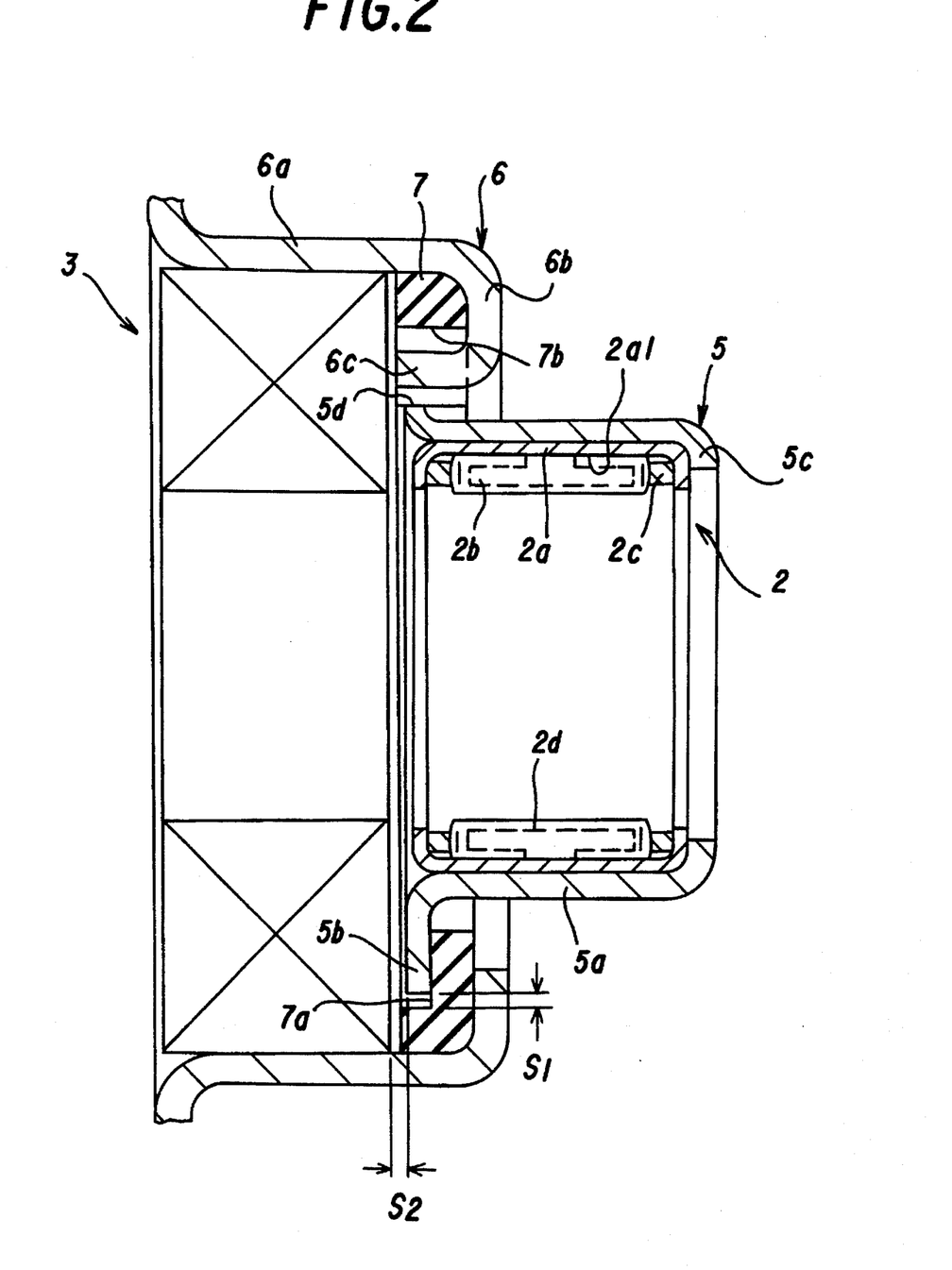

As shown in FIG. 1 and FIG. 2 (enlarged view of FIG. 1a), a main frame 4, which is a stationary member, rotatably supports a rotatable shaft 1 through a rolling contact bearing 3, and a roller clutch 2 for controlling the rotation of the rotatable shaft 1 is attached to the main frame 4 through a clutch housing 5 with the roller clutch 2 aligned with the rolling contact bearing 3. In addition, a sealed type deep groove ball bearing is shown by way of example as the rolling contact bearing, but an angular contact ball bearing or the like may be used.

A bearing housing 6 for receiving the rolling contact bearing 3 is formed integral with the main frame and comprises a cylindrical portion 6a adapted to have the outer ring 3a of the rolling bearing 3 fitted therein, an inner flange portion 6b continuously extending radially inwardly from one end of the cylindrical portion 6a, and a plurality (three in the figure) of tooth portions 6c formed at circumferentially equal intervals of the inner flange portion 6b. The tooth portions 6c are formed by cutting the inner flange 6b and inwardly Bending the same. The roller clutch 2 has a shell type outer ring 2a adapted to fit in the clutch housing 5. The inner peripheral surface of the outer ring 2a is formed with a plurality of cam surfaces 2a1, and a plurality of wedge spaces are formed between the cam surfaces 2a1 and the outer peripheral surface of the rotatable shaft 1 or the outer peripheral surface of the inner ring in the case that such inner ring is provided. A needle roller 2b is engageably installed in each wedge space. The needle rollers 2b are received in the pockets of a retainer 2c made, e.g., of resin and are pressed toward the narrow clearance sides of the wedge spaces by spring means 2d installed between the lateral walls of the pockets of the retainer 2c and the outer peripheral surfaces of the needle rollers 2b. In addition the outer ring 2a can be dispensed with by forming cam surfaces on the cylindrical portion 5a of the clutch housing 5.

The function of the roller clutch 2 is the same as the conventional one described above and a description thereof is omitted. In addition, this invention relates to an attachment structure for the roller clutch and is not directed to a particular roller clutch, and various other types of roller clutches including a two-way roller clutch than the one having the basic arrangement described above; thus, in embodying the present invention, such known types may be selectively employed.

The clutch housing 5 for receiving the roller clutch 2 comprises a cylindrical portion 5a adapted to have the outer ring 2a of the roller clutch 2 fitted therein, an outer flange portion 5b continuously extending radially outwardingly from one end of the cylindrical portion 5a, a flange portion 5c continuously extending radially inwardly from the other end of the cylindrical portion 5a, and a plurality (three in the FIG. 1b) of notch portions 5d formed at circumferentially equal intervals of the outer flange portion 5b. These notch portions 5d and tooth portions 6c are circumferentially engageable with each other, thereby providing means for preventing rotation of the clutch housing 5 relative to the bearing housing 6, allowing the reliable clutch function to be exerted.

An annular member 7 of resin or rubber is inserted in the end of the cylindrical portion 6a of the bearing housing 6 at the side of the inner flange portion 6b. One end surface of this annular member 7 is formed with a recess 7a having an outer diameter slightly greater than that of the outer flange portion 5b of the clutch housing 5 and a depth slightly greater than the thickness of the outer flange portion 5b. Further, the annular member 7 has notch portions 7b at positions corresponding to the tooth portions 6c of the bearing housing 6.

The recess 7a of the annular member 7 has the outer flange portion 5b of the clutch housing 5 received therein, and there is a radial clearance S1 formed around the outer periphery of the outer flange portion 5b. Further, the outer flange portion 5b axially engage the inner flange portion 6b of the bearing housing 6 through the annular member 7. Thereby, there is provided means for preventing the clutch housing 5 from slipping off to the right hand side in FIG. 1b and 2. Movement of the clutch housing 5 in the opposite direction is restrained by the end surface of the outer ring 3a of the rolling contact bearing 3. That is, the clutch housing 5 is axially movable within the axial clearance denoted by S2. These clearances S1 and S2 are on the order of 0.5 mm respectively.

The presence of the clearances S1 and S2 enables the clutch housing 5 and roller clutch 2 received therein to move radially and axially of the main frame 4 and bearing housing 6. Therefore, if an inclination is produced in the rotatable shaft 1 as by errors in attachment, the roller clutch 2 is displaced within the range of the clearances S1 and S2 depending on the inclination of the rotatable shaft 1, thereby automatically axially aligning the roller clutch 2 and rotatable shaft 1.

FIGS. 3 through 8 show other embodiments of the invention. In addition, in FIGS. 3 through 8, substantially the same members and portions as those in the preceding embodiment are denoted by the same reference characters and a repetitive description thereof is omitted.

Figure 3A:
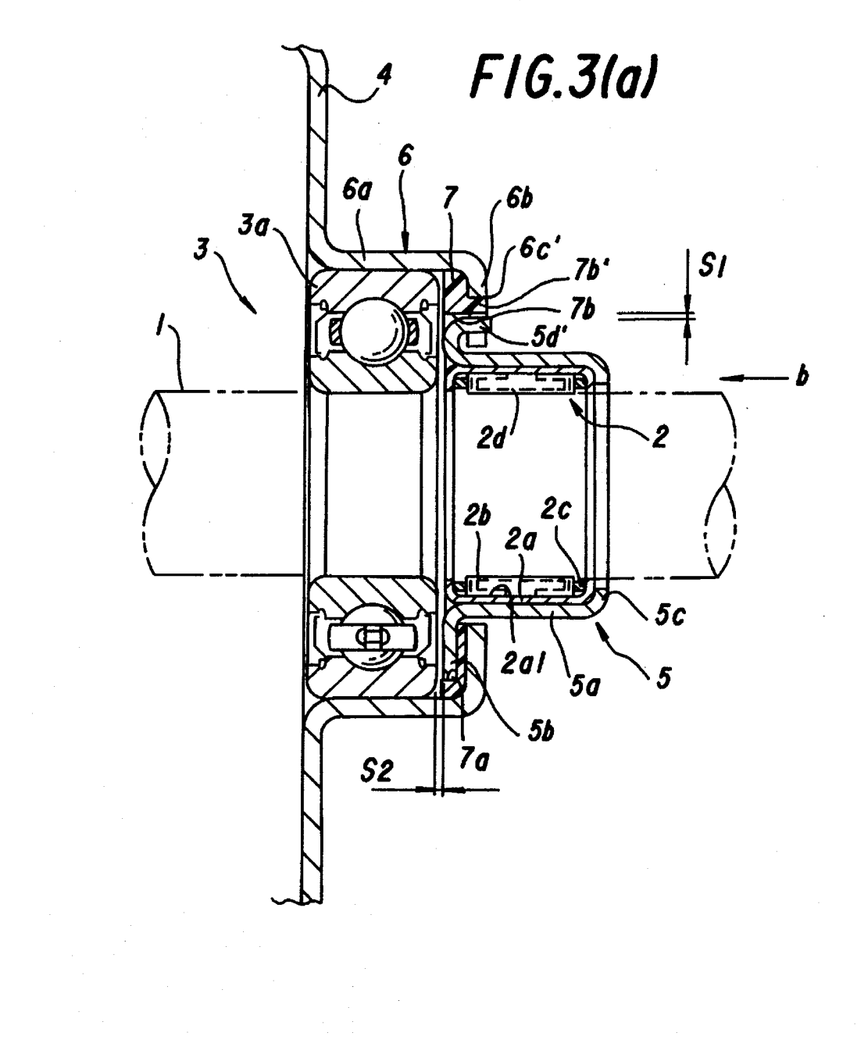
Figure 3B:
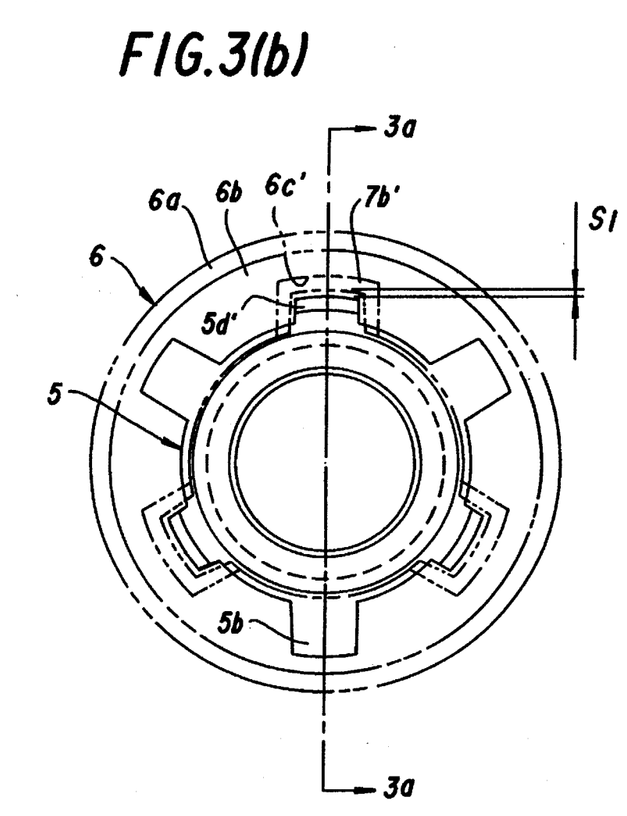

In an embodiment shown in FIG. 3, the bearing housing 6 is formed with notch portions 6c' while the clutch housing 5 is formed with tooth portions 5d'. In this embodiment, the outer flange portion 5b of the clutch housing 5 is formed with a plurality (six in FIG. 3b) of circumferentially equispaced tooth, and some of these tooth (three alternate ones in FIG. 3b) are outwardly bent to form tooth portions 5d. Further, the edges 7b' of the notch portions 7b of the annular member 7 project from the end surfaces thereof (to form U-shaped portions in FIG. 3b) to fit in the notch portions 6c' of the bearing housing 6. The radial clearance S1 is formed between the inner periphery of the notch portions 7b of the annular member 7 and the outer periphery of the tooth portions 5d' of the clutch housing 5. In addition, the tooth portions 5d may be formed by slitting the annular outer flange portion 5b and outwardly bending the slitted portions in accordance with the arrangement shown in FIGS. 1 and 2. Reversely, the tooth portions 6c shown in FIGS. 1 and 2 may be formed in accordance with the arrangement of this embodiment.

Figure 4A:
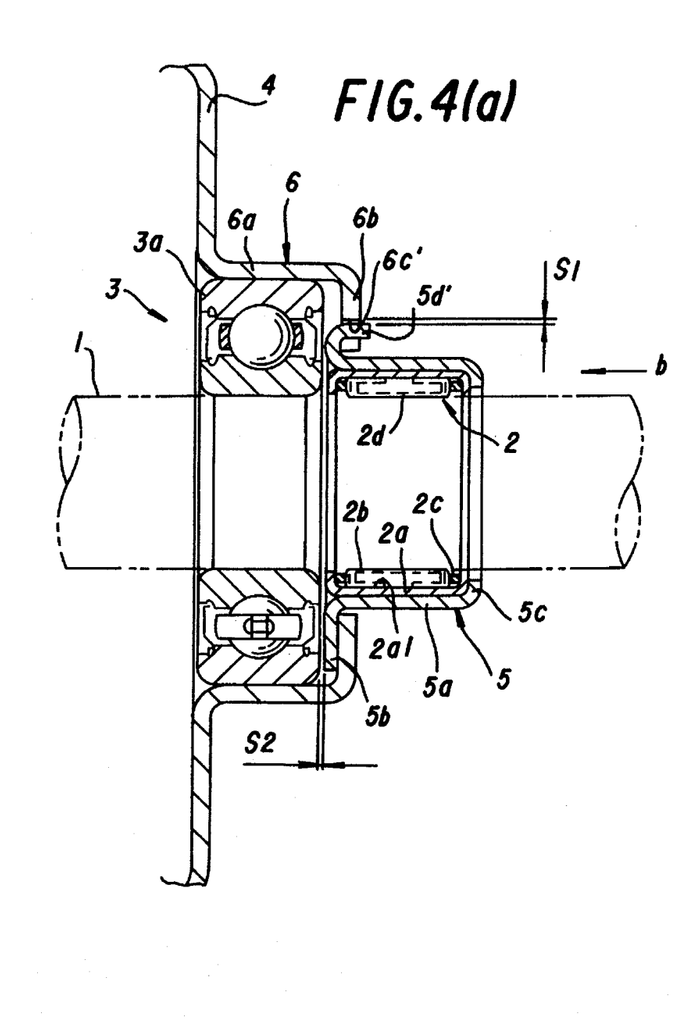
Figure 4B:
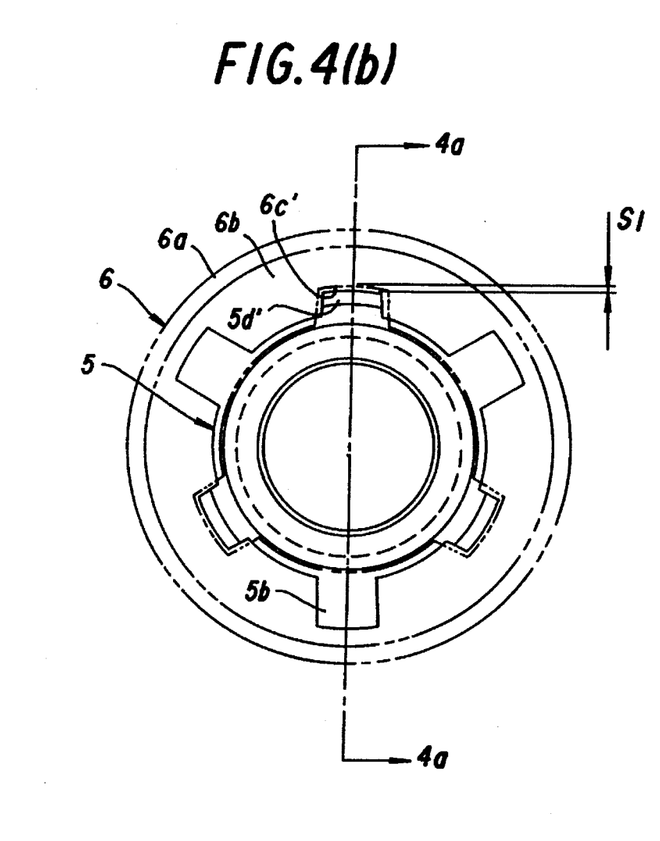

An embodiment shown in FIG. 4 is not provided with the annular member 7 shown in FIG. 3. The rest of the arrangement is the same as that shown in FIG. 3.

Figure 5A:
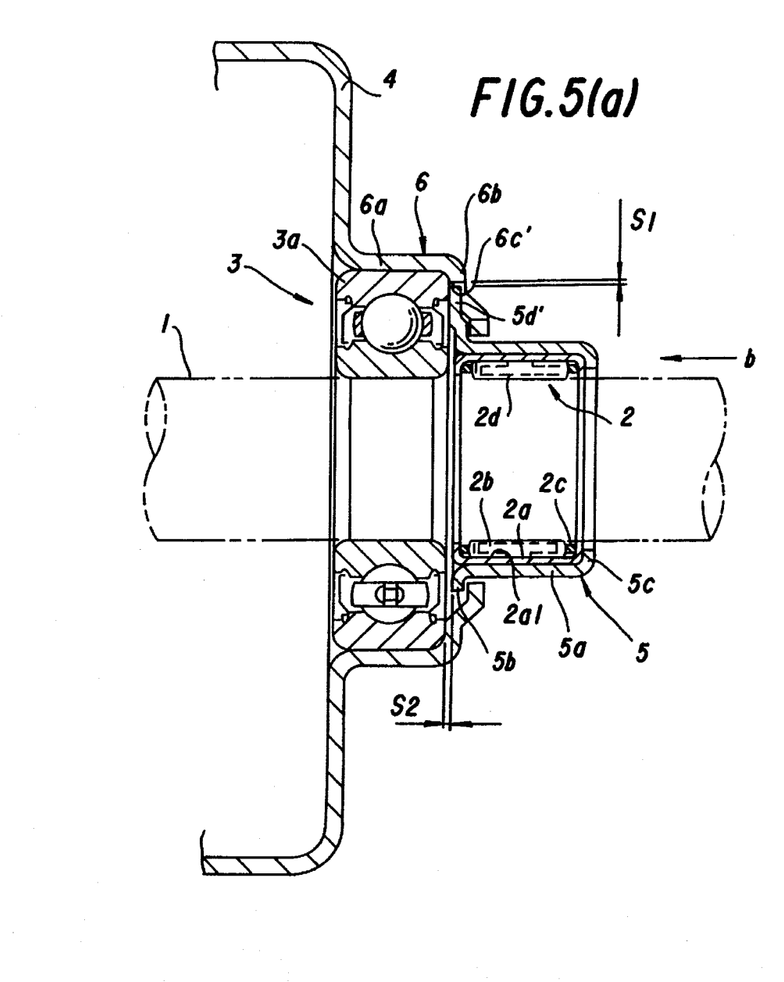
Figure 5B:
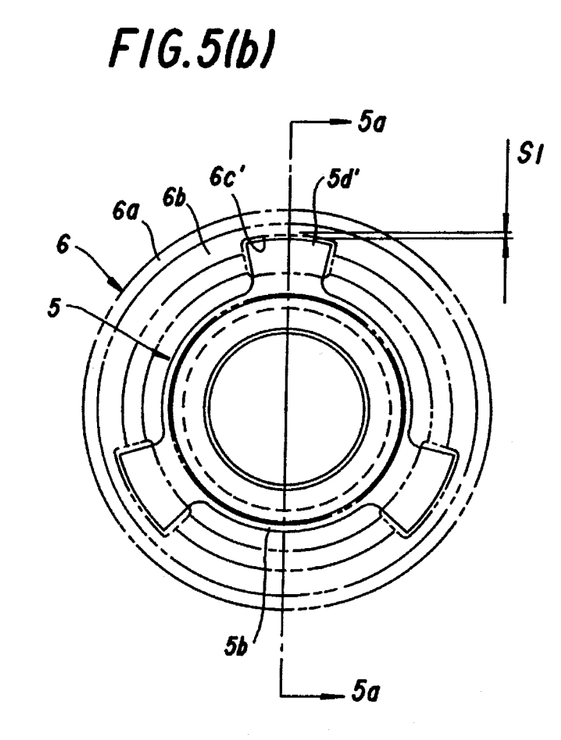
Figure 7:
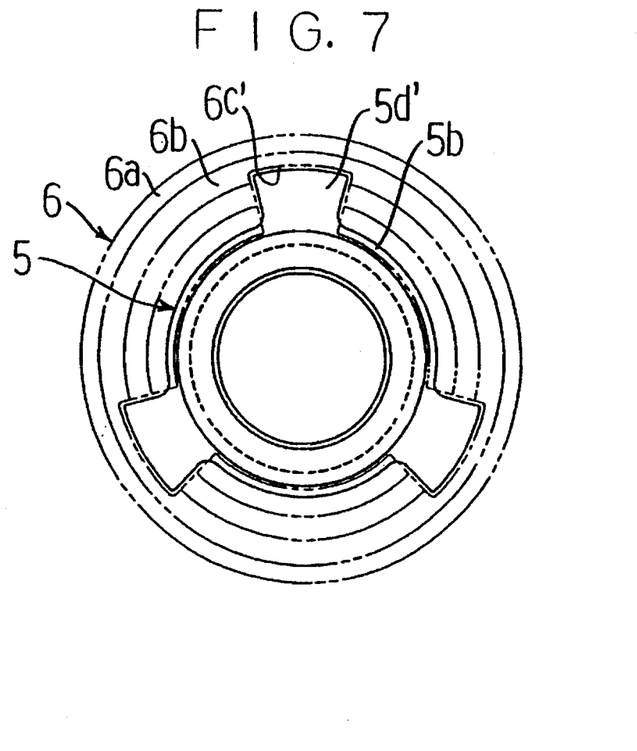
FIG. 7 is a front view showing a modification of the embodiment shown in FIG. 5.

An embodiment shown in FIG. 5 comprises notch portions 6c formed in the bearing housing 6 and tooth portion 5d formed in clutch housing 5. In this embodiment, the notch portions 6c' are formed by outwardly bending part of the inner flange portion 6b of the bearing housing 6 and notching this bent portion in window form at a plurality (three in FIG. 5b) of circumferentially equispaced locations. Further, the outer flange portion 5b of the clutch housing 5 is somewhat reduced in length and the tooth portions 5d' continuously extend radially outwardly from a plurality (three in FIG. 5b) of circumferentially equispaced locations on the outer flange portion 5b. In addition, the notch portions 6c', as shown in FIG. 7, may be formed by notching the inner flange portion 6b from the inner diameter side.

Figure 6A:
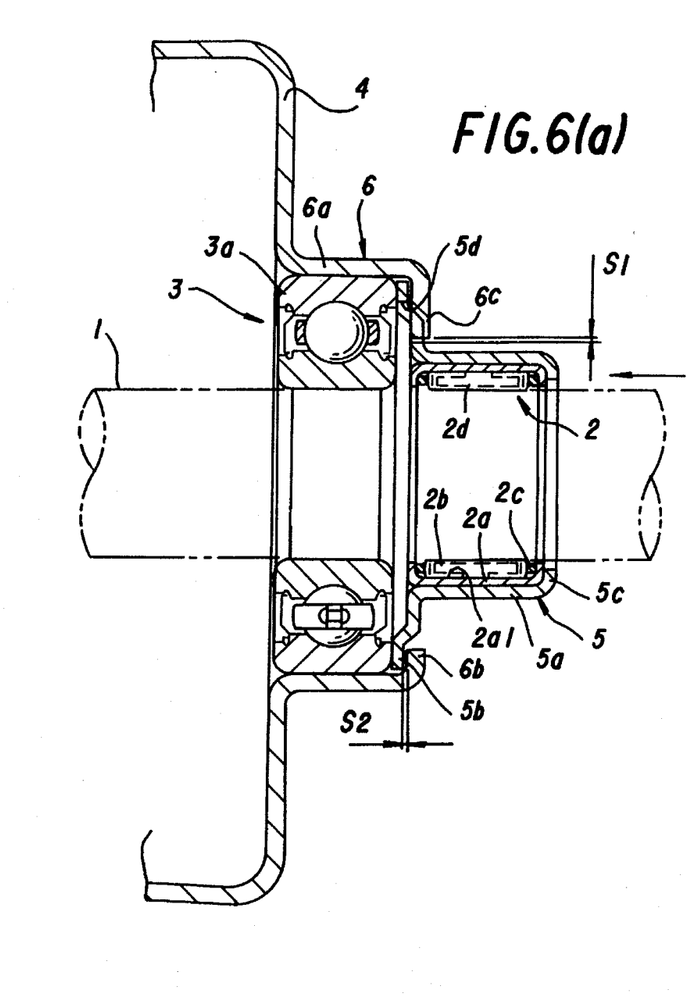
Figure 6B:
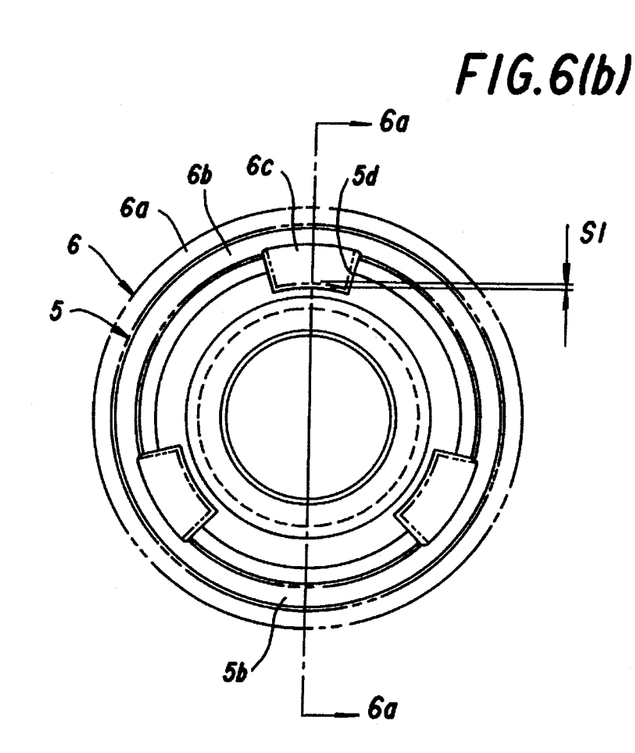
Figure 8:
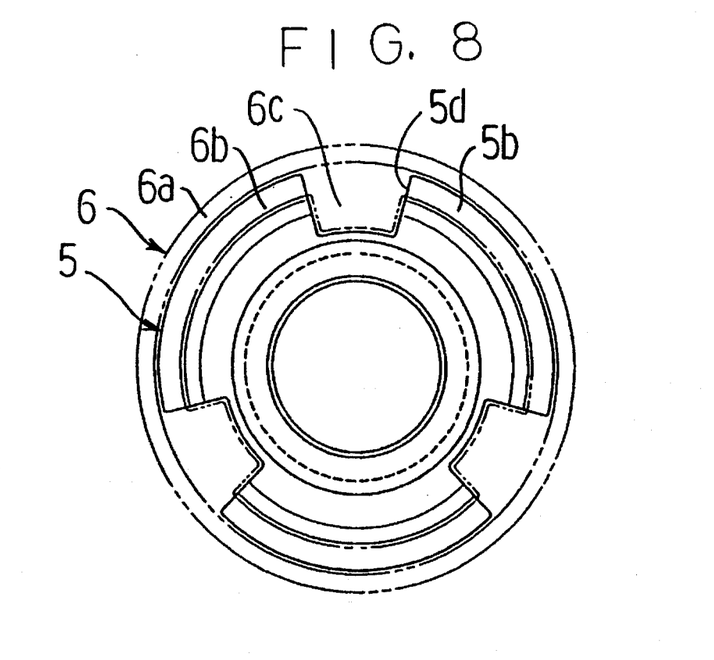
FIG. 8 is a front view showing a modification of the embodiment shown in FIG. 6.

An embodiment shown in FIG. 6 comprises tooth portions 6c formed in the bearing housing 6 and notch portions 5d formed in the clutch housing 5. In this embodiment, the inner flange portion 6b of the bearing housing 6 is somewhat reduced in length and the tooth portions 6c continuously extend radially inwardly from a plurality (three in FIG. 7b) of circumferentially equispaced locations on the inner flange portion 6b. Further, the notch portions 5d are formed by inwardly bending part of the outer flange portion 5b of the clutch housing 5 and notching this bent portion in window form at a plurality (three in FIG. 7b) of equispaced locations. In addition, the notch portions 5d, as shown in FIG. 8, may be formed by notching the outer flange portion 5b from the outer diameter side.

Further, the embodiments shown in FIGS. 4 through 6 may be provided with the annular member 7 shown in FIGS. 1 through 3.

Figure 9:
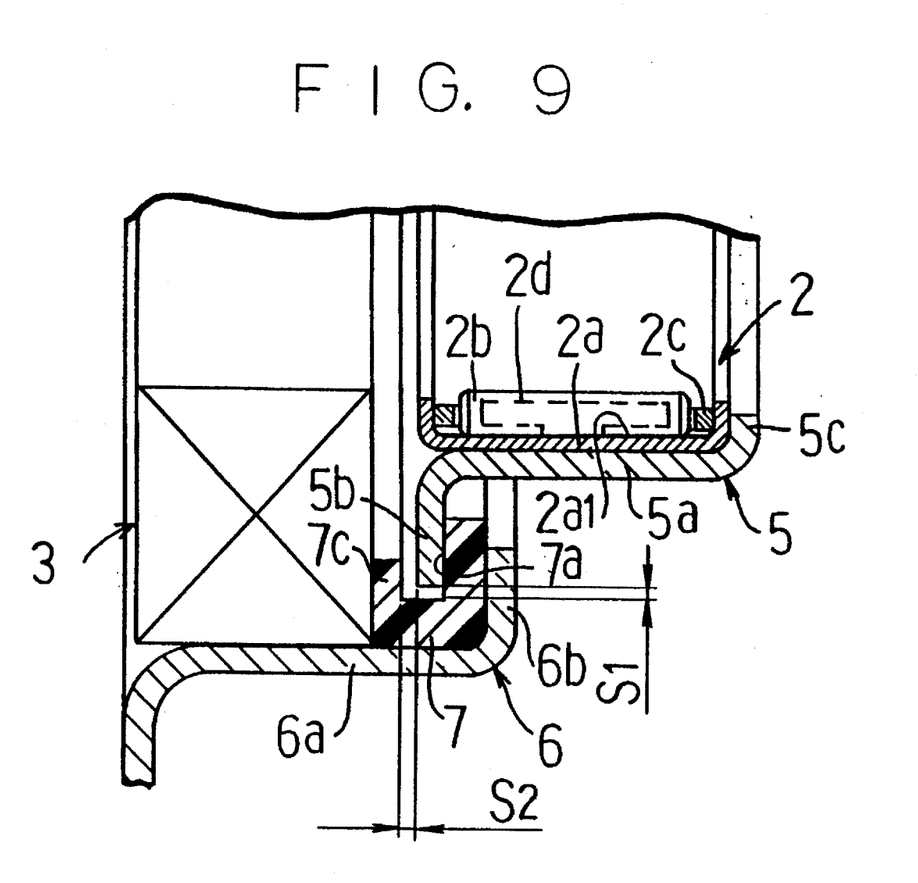
FIG. 9 is a fragmentary sectional view showing another embodiment.

An embodiment shown in FIG. 9 is a modification of the arrangement shown in FIGS. 1 and 2, wherein the annular member 7 is provided with a partial or annular projection 7c projecting toward the inner diameter side. The axial clearance S2 is formed between the projection 7c and the outer flange portion 5b of the clutch housing 5.

In this embodiment, since the projection 7c of the annular member 7 is interposed between the outer flange portion 5b of the clutch housing 5 and the rolling contact bearing 3 to prevent their metal contact with each other, shock and vibration which are likely to attend the on/off movement of the roller clutch are effectively absorbed so that the occurrence of noise and abnormal sound is more certainly suppressed.

What is claimed is:

1. An aligning type roller clutch for controlling a direction of rotation of a rotatable shaft supported for rotation in a main frame through a rolling contact bearing, comprising:

a bearing housing, for receiving the rolling contact bearing, is formed integrally with the main frame;

a clutch housing for receiving a roller clutch;

an outer flange portion of the clutch housing and an inner flange portion of the bearing housing axially engage with each other;

tooth portions and notch portions circumferentially engageable with each other are distributively provided in the bearing housing and the clutch housing; and radial and axial clearances are formed between the bearing housing and clutch housing for floating the clutch housing relative to the bearing housing, wherein the clutch housing is alignably attached to the main frame.

2. An aligning type roller clutch for controlling a direction of rotation of a rotatable shaft supported for rotation in a main frame through a rolling contact bearing, comprising:

a bearing housing, for receiving the rolling contact bearing, is formed integrally with the main frame;

a clutch housing for receiving a roller clutch;

an outer flange portion of said clutch housing and an inner flange portion of the bearing housing axially engage with each other through an annular member of resin or rubber;

tooth portions and notch portions circumferentially engageable with each other are distributively provided in the bearing housing and the clutch housing; and radial and axial clearances are formed between the bearing housing and the clutch housing for floating the clutch housing relative to the bearing housing, wherein the clutch housing is alignably attached to the main frame.

3. An aligning type roller clutch comprising:

a bearing housing having a cylindrical portion fitted on an outer ring of a rolling contact bearing, an inner flange portion formed on one end of the cylindrical portion, and tooth portions formed at equal intervals circumferentially of the inner flange portion;

a clutch housing having a cylindrical portion fitted on an outer ring of a roller clutch, an outer flange portion formed on one end of the cylindrical portion, and notch portions formed at equal intervals circumferentially of the outer flange portion; and an annular member of resin or rubber inserted in the cylindrical portion of the bearing housing and having notch portions for receiving the tooth portions of the bearing housing, and a recess for receiving the outer flange portion of the clutch housing.

4. An aligning type roller clutch comprising:

a bearing housing having a cylindrical portion fitted on an outer ring of a rolling contact bearing, an inner flange portion formed on one end of the cylindrical portion, and notch portions formed at equal intervals circumferentially of the inner flange portion;

a clutch housing having a cylindrical portion fitted on an outer ring of a roller clutch, an outer flange portion formed on one end of the cylindrical portion, and tooth portions formed at equal intervals circumferentially of the outer flange portion; and an annular member of resin or rubber inserted in the cylindrical portion of the bearing housing and having notch portions for engaging the tooth portions of the clutch housing, and a recess for receiving the outer flange portion of the clutch housing.

* * * * *